United States Patent [19]
Ross et al.

[11] Patent Number: 5,859,628
[45] Date of Patent: Jan. 12, 1999

[54] APPARATUS AND METHOD FOR A PERSONAL ONBOARD INFORMATION SYSTEM

[75] Inventors: Monte Ross, St. Louis, Mo.; Howard Kenig, Southfield, Mich.

[73] Assignee: POIS, Inc., St. Louis, Mo.

[21] Appl. No.: 556,498

[22] Filed: Nov. 13, 1995

Related U.S. Application Data

[63] Continuation of Ser. No. 177,677, Jan. 5, 1994, abandoned.

[51] Int. Cl.$^6$ .............................. G09G 5/00; G09G 5/26; G08G 1/123; G06F 1/16
[52] U.S. Cl. ......................... 345/173; 345/130; 340/990; 361/686; 364/708.1
[58] Field of Search ................................... 345/173, 128, 345/130, 146, 901; 361/683, 686; 364/708.1; 340/990

[56] References Cited

U.S. PATENT DOCUMENTS

| | | | |
|---|---|---|---|
| 4,229,947 | 10/1980 | Ross et al. | 364/443 |
| 4,345,147 | 8/1982 | Aaron | 364/708.1 |
| 4,630,947 | 12/1986 | Yoshida | 345/130 |
| 4,733,356 | 3/1988 | Haeussermann et al. | 364/443 |
| 4,787,040 | 11/1988 | Ames et al. | 364/424 |
| 4,796,190 | 1/1989 | Cummings | 364/443 |
| 4,842,378 | 6/1989 | Flasck | 364/708.1 |
| 4,991,935 | 2/1991 | Sakurai | 345/901 |
| 5,038,401 | 8/1991 | Inotsume | 345/173 |
| 5,051,935 | 9/1991 | Matty | 364/443 |
| 5,126,954 | 6/1992 | Morita | 364/708.1 |
| 5,159,323 | 10/1992 | Mase | 345/173 |
| 5,159,556 | 10/1992 | Schorter | 364/449 |
| 5,220,507 | 6/1993 | Kirson | 364/444 |
| 5,241,671 | 8/1993 | Reed et al. | 395/600 |
| 5,313,596 | 5/1994 | Swindler | 364/708.1 |
| 5,331,580 | 7/1994 | Miller et al. | 364/708.1 |
| 5,446,465 | 8/1995 | Diefes et al. | 343/357 |
| 5,465,207 | 11/1995 | Boatwright et al. | 364/708.1 |
| 5,468,947 | 11/1995 | Danielson et al. | 235/472 |
| 5,475,399 | 12/1995 | Borsuk | 345/130 |
| 5,488,575 | 1/1996 | Danielson et al. | 364/708.1 |
| 5,544,010 | 8/1996 | Schultz et al. | 361/686 |
| 5,555,491 | 9/1996 | Tao | 361/686 |
| 5,579,528 | 11/1996 | Register | 364/704 |
| 5,615,384 | 3/1997 | Allard et al. | 345/173 |
| 5,617,343 | 4/1997 | Danielson et al. | 364/708.1 |

*Primary Examiner*—Jeffery Brier
*Assistant Examiner*—David L. Lewis
*Attorney, Agent, or Firm*—Senniger, Powers, Leavitt & Roedel

[57] ABSTRACT

A personal onboard information system for use in a vehicle. The system includes a portable, personal computer including a touch-responsive screen and a cradle mounted on the vehicle for detachably receiving the computer. The computer is programmed to generate characters of preset size on a display on the screen. The cradle has a lamp for illuminating the computer screen and a power supply for supplying the computer with power when the computer is in the cradle. The system further includes an interface communicating with the computer for formatting the display for use of the computer in the vehicle when the computer is in the cradle. The interface is resident in the computer or in the cradle and causes the display to display characters relatively larger than the characters of preset size so that the characters can be easily viewed by a passenger thereby facilitating use of the computer in the vehicle.

25 Claims, 5 Drawing Sheets

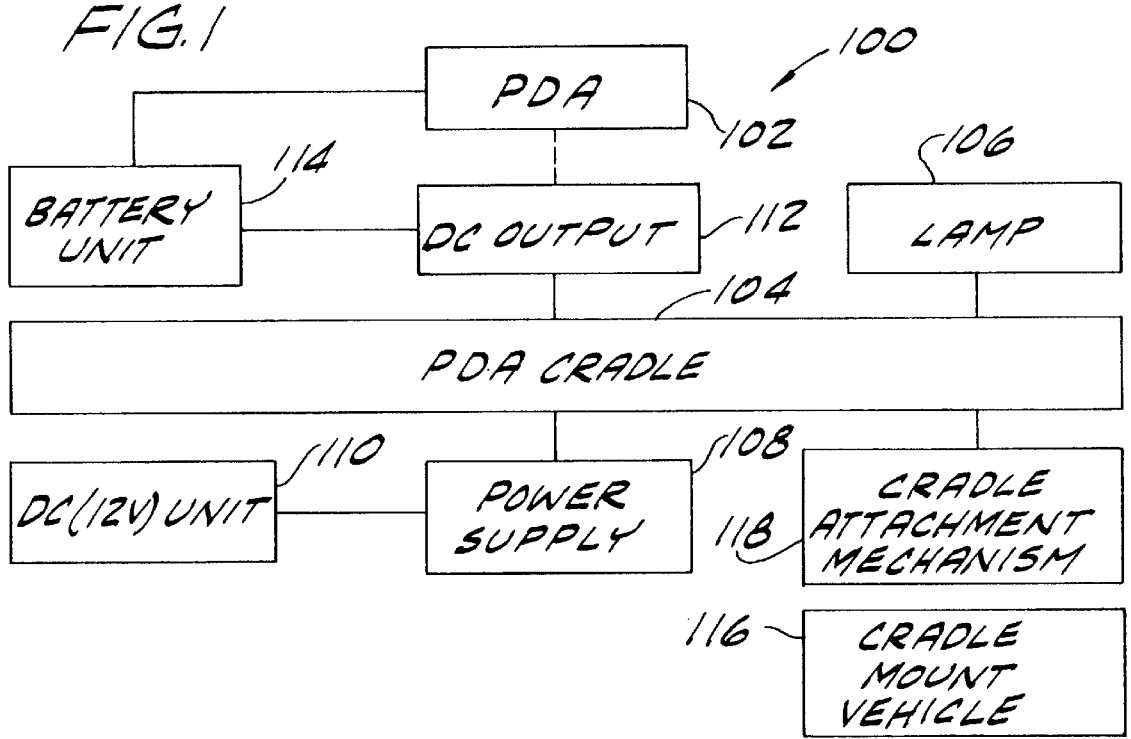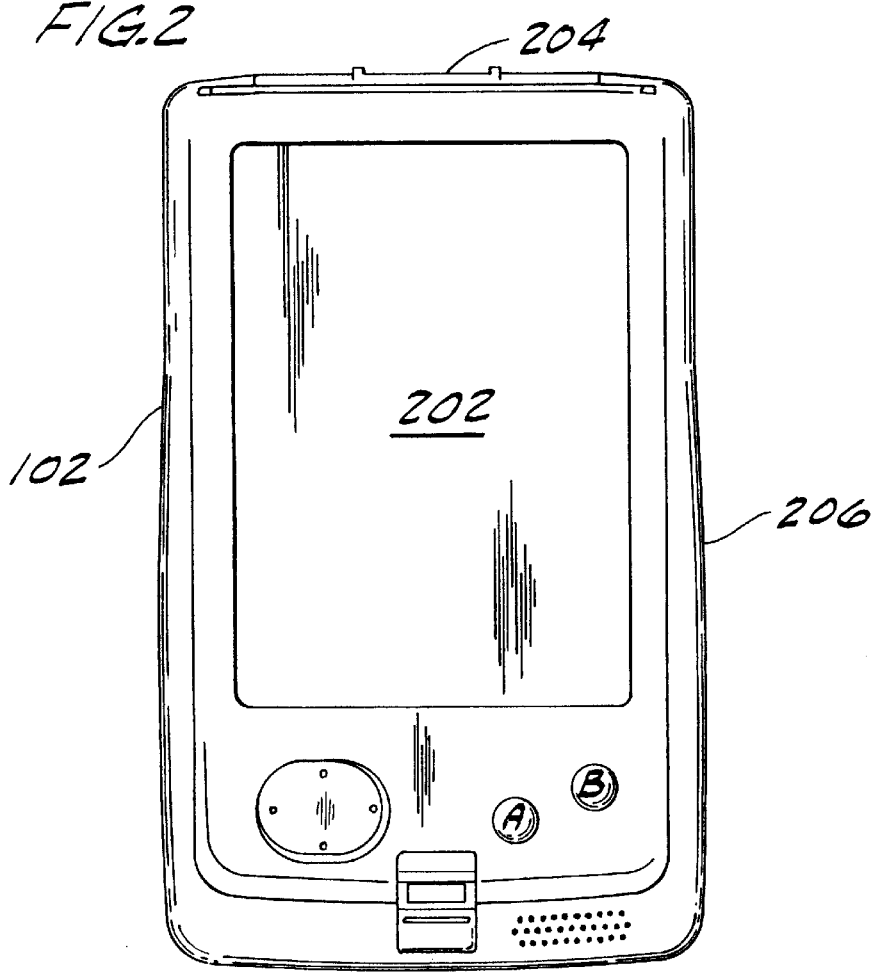

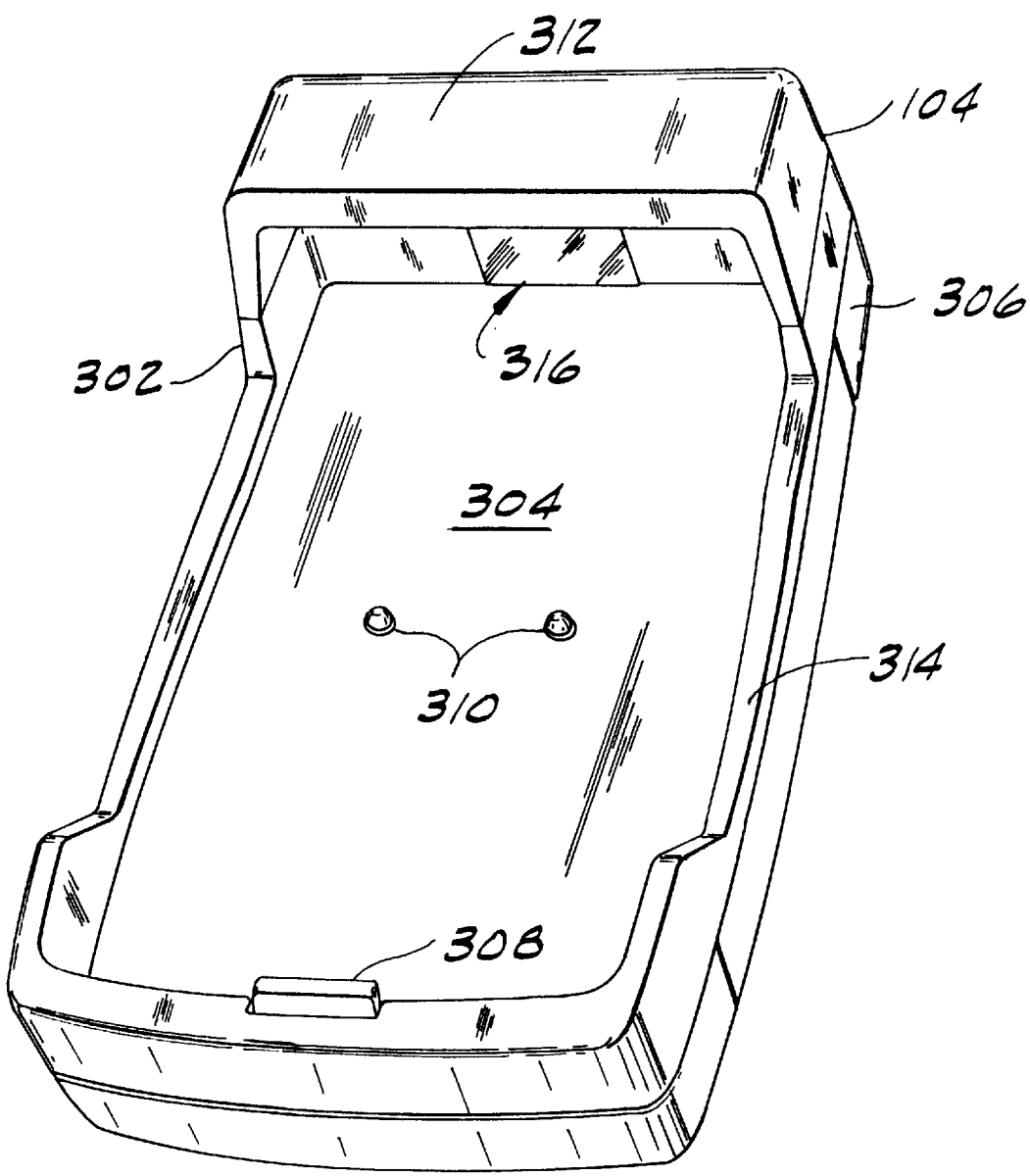

APPARATUS AND METHOD FOR A PERSONAL ONBOARD INFORMATION SYSTEM

This is a continuation of application Ser. No. 08/177,677, filed Jan. 5, 1994.

BACKGROUND OF THE INVENTION

This invention generally relates to portable, personal computer systems and, in particular, such a system formatted for use in an automobile or other vehicle.

A portable, personal computer system which is small enough to be easily held in a user's hand offers numerous advantages over larger computer systems. Portability is one of the essential advantages of these palm-top, or hand-held, computers, often referred to as personal digital assistants (PDA). Unfortunately for persons traveling, though, a PDA is particularly ill-suited for use in a vehicle, such as an automobile.

In the environment of a vehicle, a PDA cannot be held in a user's hand while operating the vehicle. Among other reasons, using a PDA configured in the conventional manner while operating a vehicle could be dangerous and increase the risk of accident by unduly distracting the vehicle's operator and occupying the operator's hands. Thus, a means for supporting the PDA in the vehicle is required to free the hands of the PDA user for driving. However, such a support necessarily places the PDA further away from the user than holding the PDA in the user's hand. Due to the relatively small size of the PDA and its screen, the characters displayed on the screen are too small to be easily viewed unless the PDA is very near its user. Further, operation of the PDA is complicated because the user, whether operating the vehicle or merely a passenger in the vehicle, is unable to precisely select the desired key (or portion of the PDA screen) due to the small size of the characters and the movement of the vehicle. For these reasons, operation of a conventional PDA system in a moving vehicle can be difficult and very hazardous.

Further disadvantages of using conventional PDA systems in a vehicle, either by the vehicle's operator or a passenger, include the inability to view the PDA screen at night without turning on the vehicle's interior lights.

Also, the battery life of the PDA is limited and a power connection within the vehicle is desirable. Conventional PDA systems, however, are lacking because the ports and connectors for power, as well as serial access to the PDA's system board, are small and fragile. For this reason, these connectors are completely incompatible with use of the PDA in a moving vehicle.

SUMMARY OF THE INVENTION

Among the several objects of the present invention may be noted the provision of a cradle for supporting a personal digital assistant (PDA) which permits ease of viewing of the PDA display by a passenger (including a driver) in a vehicle; the provision of such cradle which permits the passenger to easily select options from an on-screen menu while the vehicle is in operation; the provision of such cradle which permits the passenger to use the PDA in the vehicle at night without turning on the interior lights of the vehicle; the provision of such cradle which permits the passenger to use the PDA in the vehicle without draining the PDA's battery; and the provision of such system which is economically feasible and commercially practical.

Briefly described, the system of the present invention is a personal onboard information system for use in a vehicle. The system includes a portable, personal computer having a touch-responsive screen and a cradle for detachably receiving the computer mounted on the vehicle. The cradle has a lamp for illuminating the computer screen and a power supply for supplying the computer with power when the computer is in the cradle.

In an alternative embodiment, the system includes a portable, personal computer including a touch-responsive screen having a display. The system further includes a cradle for detachably receiving the computer, a mount for supporting the cradle on the vehicle and a circuit for sensing the presence of the computer in the cradle. An interface communicates with the computer for formatting the display for use of the computer in the vehicle when the presence of the computer in the cradle is sensed by the sensing circuit.

In yet another embodiment, the system of the present invention includes a portable, personal computer including a touch-responsive screen having a display. The computer is programmed to generate characters of preset size on the display. The system includes a cradle for detachably receiving the computer and a mount for supporting the cradle on the vehicle. The system further includes an interface resident in the computer or in the cradle for formatting the display for use of the computer in the vehicle when the computer is in the cradle. The interface causes the display to display characters relatively larger than the characters of preset size so that the characters can be easily viewed by a passenger (including a driver) thereby facilitating use of the computer in the vehicle.

Alternatively, the present invention includes a method for configuring a portable, personal computer including a touch-responsive screen having a display for use in a vehicle. The method comprises the steps of detachably receiving the computer in a cradle on the vehicle and sensing the presence of the computer in the cradle. The method further includes formatting the display for use of the computer in the vehicle when the presence of the computer in the cradle is sensed by causing the display to display characters relatively larger than characters normally displayed by the computer so that the characters can be easily viewed by a passenger (including a driver) thereby facilitating use of the computer in the vehicle.

In another form, the present invention is a method for displaying information on a portable, personal computer in a vehicle. The method includes the step of reformatting the computer to display characters relatively larger than characters normally displayed by the computer so that the larger characters can be easily viewed by a passenger (including a driver) of the vehicle. Further, the method includes generating an on-screen menu displaying options available to the passenger. The on-screen menu is responsive to the passenger touching the screen for selecting the available options. Also, the method includes the steps of reformatting the display to have a dedicated portion and a variable portion, displaying on the on-screen menu a preferred one of the available options at the dedicated portion and displaying on the on-screen menu various other ones of the available options at the variable portion.

Other objects and features will be in part apparent and in part pointed out hereinafter.

BRIEF DESCRIPTION OF THE DRAWINGS

FIG. 1 is a block diagram of a personal onboard information system including a personal digital assistant (PDA) and a cradle for supporting the PDA in a vehicle according to a preferred embodiment of the invention.

FIG. 2 is a top plan view of the PDA of FIG. 1.

FIG. 3 is a perspective view of the cradle of FIG. 1.

Corresponding reference characters indicate corresponding parts throughout the drawings.

DETAILED DESCRIPTION OF PREFERRED EMBODIMENTS

Figure 5:
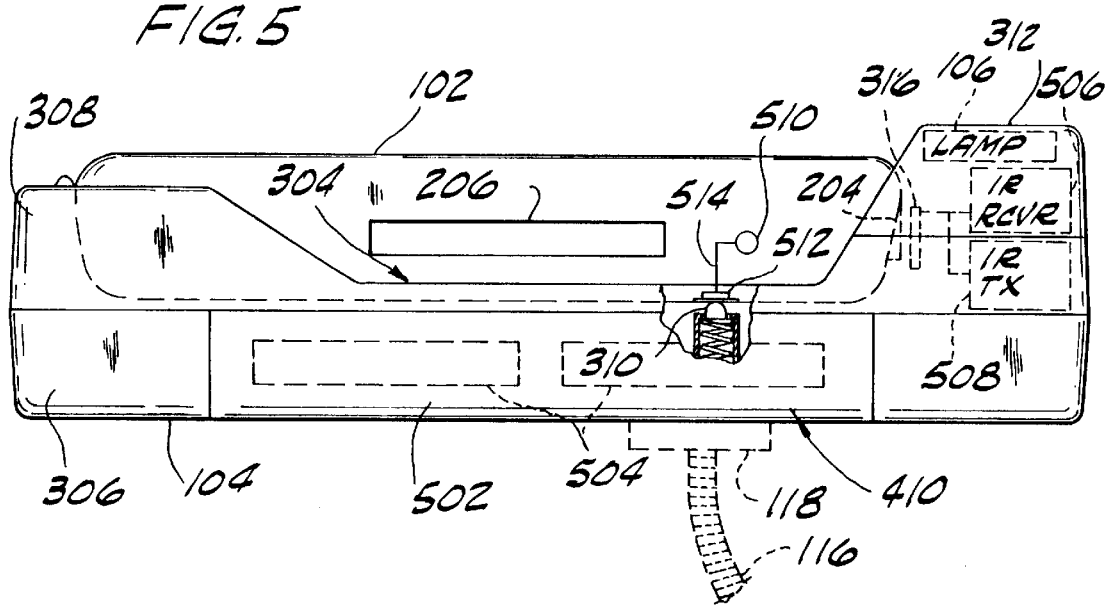
FIG. 5 is a side plan view of the cradle of FIG. 3 having the PDA of FIG. 2 mounted therein.

Referring to FIG. 1, a system 100 according to one preferred embodiment of the invention is illustrated in block diagram form. The system 100 is a personal onboard information system for use in a vehicle (not shown) and includes a personal digital assistant (PDA) 102. Preferably, the PDA 102 is a portable, personal computer such as the Casio® Zoomer, Tandy® Z-550 or other comparable PDA. System 100 further includes a cradle 104 for detachably receiving PDA 102. The cradle 104 has a lamp 106 for illuminating PDA 102 and a power supply 108 for supplying PDA 102 with power when it is in cradle 104.

The power supply 108 includes electronic circuitry in the form of a PDA battery charging circuit which receives power from a 12 volt DC input 110, such as the vehicle's 12 volt electrical system. PDA 102 is adapted to have power provided to it from power supply 108 at a DC output 112 after the power is scaled by electronic circuitry in power supply 108 to a voltage that is appropriate for charging a battery unit 114 of the particular PDA 102 detachably received by cradle 104. Alternatively, the DC output 112 may be directly connected to PDA 102 and battery charging circuit 114 is not necessary.

Cradle 104 preferably makes connection to a power input port (see FIG. 5) of PDA 102 by using an appropriate mating connector or by replacing the battery compartment door (not shown) of PDA 102 with a substitute compartment door (not shown). The substitute compartment door allows access to the internal battery or batteries of PDA 102. Either connection method provides for a reliable and rugged electrical connection between cradle 104 and PDA 102. For example, by replacing the battery cover of PDA 102 and the standard batteries with the battery unit 114, preferably a rechargeable stack (NiCad or NiMH batteries wired to a cover shell having exposed electrodes), PDA 102 can be detachably latched into cradle 104 in a manner familiar to any cordless telephone user. In this manner, cradle 104 according to the invention provides power to PDA 102 in the environment of a vehicle. Similarly, cradle 104 can be used to provide power to PDA 102 for home or office use.

In a preferred embodiment of the invention, an indicator lamp (not shown) on cradle 104 informs the user that the batteries of PDA 102 are being charged (e.g., lamp color red) or that they are already fully charged (e.g., lamp color green). If PDA 102 contains non-rechargeable batteries, then the indicator lamp is turned off and no charging power is supplied to PDA 102 via power supply 108.

Cradle 104 is mounted on the vehicle by a universal flexible mount 116 connected to cradle 104 by a cradle attachment mechanism 118. The mount 116 is a flexible or adjustable fixture having one end firmly attached to the vehicle's floor or dash and is similar to those presently used for mounting cellular telephones in automobiles. Preferably, mount 116 and cradle attachment mechanism 118 are sufficiently strong and stable to withstand the constant jarring, environmental extremes, vibratory stresses and other abuses which consistently act upon vehicle components.

Referring to FIG. 2, PDA 102 is shown with a touch-responsive screen 202 for displaying characters or touch-responsive keys. As is well known in the art, the touch-responsive screen 202 includes a means for selecting or designating a location on the surface of screen 202 in response to a pointing device being placed on the surface of screen 202. Essentially, screen 202 comprises data panels placed either on the display surface or between the user and the display surface. As described above, PDA 102 also provides ports and connectors for power and serial access to its system board, and preferably, includes at least one input/output port such as an infrared window or port 204 and a card slot 206 (see FIG. 5).

FIG. 3 illustrates cradle 104 comprising a housing 302 having of an upper well 304, into which PDA 102 inserts and latches, and a lower portion 306 containing various control circuitry. The lower portion 306 contains a main circuit board, its power supply, and optionally supports an infrared data communications link for communicating with and formatting PDA 102 (see FIGS. 1 and 4). Housing 302 further houses lamp 106 for illuminating screen 202 of PDA 102 and includes a spring-loaded latch 308 so that well 304 detachably receives PDA 102. Cradle 104 also includes spring-loaded DC contacts, such as push pins 310, for connecting DC output 112 to either the battery unit 114 or the power input port (see FIG. 5) of PDA 102.

Housing 302 of cradle 104 also includes a shroud 312 for surrounding lamp 106. Since turning on the vehicle's interior lights may interfere with operation of the vehicle at night, illumination is provided in cradle 104 to PDA 102. Lamp 106 illuminates screen 202 of PDA 102 when ambient light is insufficient for reading the display and the shroud 312 keeps the light only on the display and keyboard of PDA 102.

Illumination of screen 202 by lamp 106 is accomplished automatically through use of a photosensor (not shown) measuring ambient light or manually by depressing a switch. In the latter case, lamp 106 is turned on by momentarily pressing a button on cradle 104. Electronic circuits turn on lamp 106 until the button (not shown) is pressed again, or until a fixed period of time elapses. Preferably, lamp 106 is adjustable for varying the intensity of illumination and power for lamp 106 is supplied by power supply 108 of cradle 104.

Alternatively, a motion sensor, heat sensor or optical interrupter switch detecting the presence of the user's hand directly over cradle 104 may be used to activate lamp 106. Lamp 106 would then turn off a preset period of time after the user removes their hand from above cradle 104.

Other aspects of the invention are also illustrated in FIG. 3. PDA 102 has at least one slot 206 (shown in FIGS. 2 and 5) for receiving a PCMIA, or PCMCIA, card (not shown). Cradle 104 includes a card access recess 314 in a side wall of cradle 104 to permit the user to insert the PCMIA card in the card receiving slot 206 when PDA 102 is in cradle 104. Also, housing 302 includes an infrared (IR) window, or IR link, for communicating with PDA 102. The use of the PCMIA card slot and the IR link 316 will be described in detail below with respect to FIG. 4.

Figure 4:
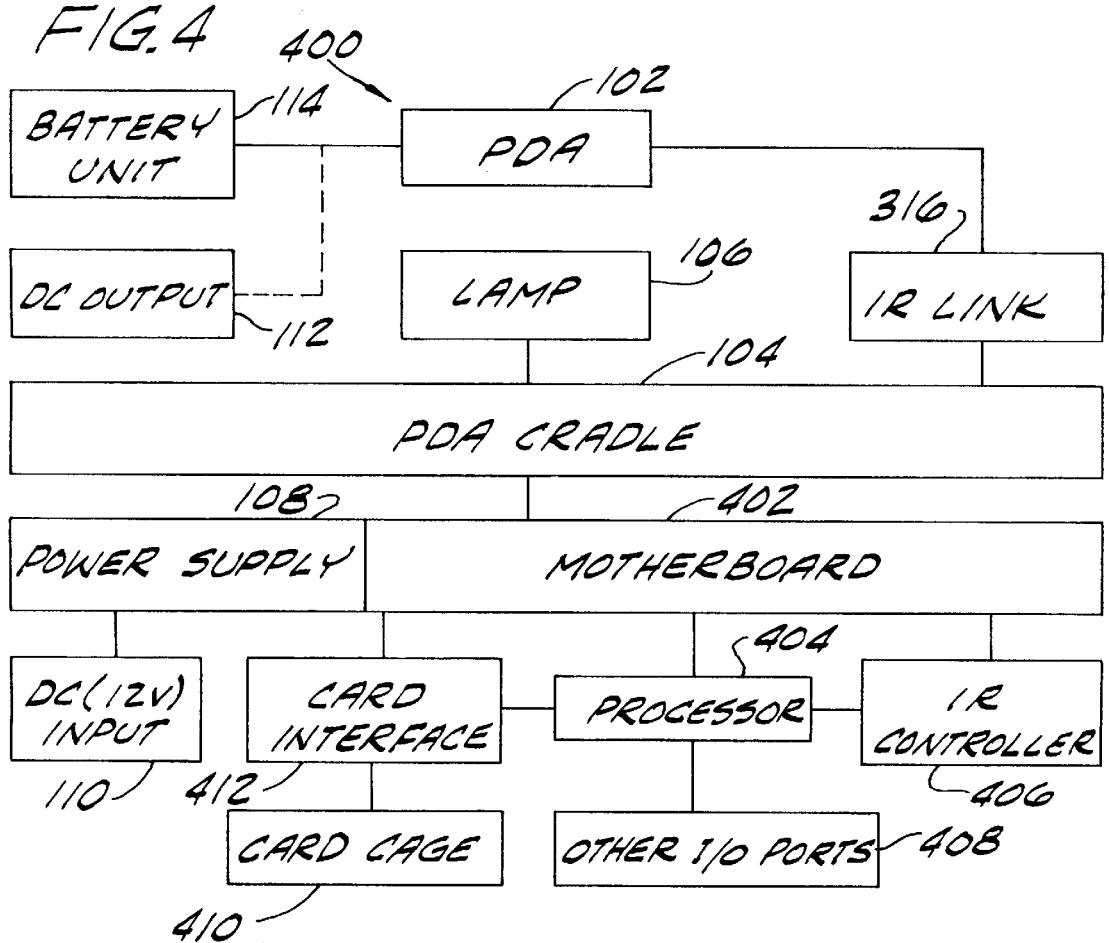
FIG. 4 is a block diagram of another preferred embodiment of the system of FIG. 1.

FIG. 4 illustrates a system 400 in block diagram form according to another preferred embodiment of the invention.

The system 400 is also a personal onboard information system for use in the vehicle and includes PDA 102 and cradle 104 for detachably receiving PDA 102. Cradle 104 illuminates screen 202 with a lamp 106 and supplies power to PDA 102 by power supply 108 when PDA 102 is in cradle 104. Infrared data link 316 senses the presence of PDA 102 in cradle 104 and/or communicates with PDA 102 for performing various functions within the vehicle. Although not specifically shown in FIG. 4, cradle 104 is mounted on the vehicle by mount 116 connected to cradle 104 by cradle attachment mechanism 118.

FIG. 4 also shows a mother board 402 containing various electronic circuitry of system 400. The mother board 402 stores a software interface and is powered by power supply 108. Alternatively, the interface is resident in PDA 102. System 400 further includes a microprocessor 404 resident in cradle 104. Mother board 402 controls operation of the interface and IR link 316, via an IR link controller circuit 406, by the microprocessor 404. In addition to IR link 316, system 400 includes other I/O ports 408 connected to the processor 404.

As stated above, PCMIA cards provide additional memory capacity as well as perform various functions related to the use of PDA 102 in the vehicle. The user can insert the cards in a card cage 410, having space for at least two cards (Type II interface, Type III size) which connect to processor 404 and mother board 402 via a card interface 412. In this manner, PDA 102 can be configured to perform various functions in the vehicle.

FIG. 5 shows an alternative embodiment of the invention. A card access door 502 of cradle 104 opens to provide access to card receiving slots 504 in PDA 102 which form card cage 410. Two exemplary card receiving slots in card cage 410 are shown in phantom at reference character 504. Card slots 504, in this embodiment, are connected to mother board 402 of cradle 104 rather than being directly connected to PDA 102 via slot 204. Also shown in phantom is an IR receiving circuit 506 and an IR transmitting circuit 508 housed in cradle 104 and optically connected to I/O port 204 via IR link 316. In this manner, cradle 104 expands the normal operating capabilities of PDA 102. Also shown in phantom is a cradle attachment mechanism 118 in the form of a base engaging a flexible mount 116 in the form of a semi-rigid cable.

FIG. 5 further shows a power input port 510 for connecting PDA 102 to a voltage source which provides power for recharging or powering PDA 102. In a preferred embodiment of the invention, the push pins 310 contact flexible contact strips 512 on the bottom of PDA 102 which are connected to the power input port 510 via line 514. The flexible contact strips 512 include conductors connected to power input port 510. Each strip has an exposed portion corresponding to one of push pins 310. The exposed portions of strips 512 are positioned so that they are in electrical contact with push pins 310 when PDA 102 is in cradle 104. In this manner, power supply 108 is connected to PDA 102 through cradle 104 for providing power to PDA 102.

In normal operation when not in cradle 104, PDA 102 is programmed to generate characters of preset size on the display. These characters are generally small (about ⅛ inches in height) and must be selected by applying pressure to the display of the PDA with a stylus the size of a pencil. In contrast, system 400 causes the display to display characters relatively larger than the characters of preset size so that the characters can be easily viewed by the user of PDA 102. These larger character (about ¼ to 1 inches in height) may be selected by applying pressure to the display of the PDA by pressing with the finger of the passenger (including a driver). A passenger could not easily use finger pressure to select a character of preset size since fingertips are usually larger than the preset size and result in simultaneously selecting more than one preset character. In this manner, use of PDA 102 in the vehicle is facilitated. System 400 also generates an on-screen menu displaying options available to the user in relatively large characters. In the preferred embodiments, the user selects from the available options displayed on the onscreen menu by touching the screen.

As described above, the interface of system 400 enables the user to operate PDA 102 with one hand when PDA 102 is detachably received by cradle 104. However, the characters, or keys, of the display must be suitably enlarged when PDA 102 is in cradle 104 to allow adequate viewing of the display and the ability to touch screen 202 without much precision. System 400 provides the interface, resident in PDA 102 or cradle 104, for reformatting the display on screen 202 for use of PDA 102 in the vehicle. Either cradle 104 senses the presence of PDA 102 in cradle 104 or the user depresses a key or switch to initiate the reformatting of the display.

Alternatively, PDA 102 runs software to monitor IR link 316 and cradle 104 generates an appropriate infrared signal instructing PDA 102 to load and run the interface software. This signal is referred to as a "wink" signal. Cradle 104 optionally includes circuitry for generating the wink signal when lamp 106 is turned on or on a periodic basis.

FIGS. 6A–D illustrate examples of displays according to preferred embodiments of the invention. As stated above, system 400 includes the interface resident in PDA 102 or resident in cradle 104 and communicated with PDA 102 via IR link 316 for formatting the display for use of PDA 102 in the vehicle. The interface facilitates use of PDA 102 in the vehicle by causing the display to display characters relatively larger than the characters of preset size so that the characters can be easily viewed and selected by a passenger. In a preferred embodiment, the interface is software resident in cradle 104 and IR data link 316 interconnects the interface and I/O port 204 of PDA 102 to provide optical communication between the two.

In a preferred embodiment of the present invention, cradle 104 has a memory in mother board 402 and the interface includes means for retrieving from the memory predetermined data relating to services available at locations along a highway. The predetermined data is retrievable in response to input from the user identifying a desired service and an origin position and is displayed by the display. Essentially, this results in the PDA functioning as a highway information system as described in U.S. Pat. Nos. 5,021,961 and 5,229,947, incorporated herein by reference.

Preferably, PDA 102 is relatively small so as to be capable of being hand-held and the on-screen menu is responsive to the user touching screen 202 with a finger for selecting the available options. The interface further includes means for causing the display to have a dedicated portion and a variable portion wherein the on-screen menu displays a preferred one of the available options at the dedicated portion and wherein the on-screen menu displays various other ones of the available options at the variable portion. The interface includes means for displaying the preferred one of the available options as a function of prior selections of the available options by the user. For example, if the user frequently selects a particular category, such as a favorite type of restaurant, the interface will display the particular category at a dedicated portion of the screen. Additionally, a particular entry within the particular category will be displayed first before those entries less frequently selected by the user. The dedicated portion of the screen is at a corner of the screen or at an edge of the screen and can be easily located by the user's touch so that the user does not have to look at the PDA display when selecting the dedicated portion.

The interface also includes means for displaying on the on-screen menu relatively large icons representative of the available options whereby a passenger is able to easily recognize the icons while in the vehicle.

In operation, system 400 according to the invention configures PDA 102 for use in a vehicle by the steps of detachably receiving PDA 102 in cradle 104 on the vehicle and sensing the presence of PDA 102 in well 304 of cradle 104. Further, system 400 formats the display on screen 202 for use of PDA 102 in the vehicle by causing the display to display characters relatively larger than characters normally displayed by PDA 102 when the presence of PDA 102 in cradle 104 is sensed. In this manner, the characters can be easily viewed by a passenger thereby facilitating use of PDA 102 in the vehicle.

In another form, system 400 displays information in a vehicle on PDA 102 by reformatting PDA 102 to display characters relatively larger than characters normally displayed on its screen 202. The larger characters are easily viewed by a passenger of the vehicle. Further, system 400 generates an on-screen menu displaying options available to the passenger. The on-screen menu is responsive to the passenger touching screen 202 for selecting the available options. System 400 also reformats the display to have a dedicated portion and a variable portion, displaying on the on-screen menu a preferred one of the available options at the dedicated portion and displaying on the on-screen menu various other ones of the available options at the variable portion.

As an example of the operation of system 400, PDA 102 is used to provide highway service information. During normal operation of PDA 102, without the aid of cradle 104, the user would use the display ("keyboard") of PDA 102 on touch screen 202 for highway services by pressing one of the many displayed categories ("keys") by using a stylus and a number of choices would be displayed. When the interface of system 400 reformats the display, fewer keys are displayed, each being considerably larger than during normal operation. The keys are located at dedicated portions near the edges or in the corners of screen 202 so they can be easily located and touched. Thus, coarse positioning of a finger (or pen or stylus) is sufficient to input data to PDA 102. The relatively larger characters and limited display information at any one time on screen 202 also allows the user to easily and quickly view the display while in the vehicle. FIGS. 6A–D illustrate examples of reformatted displays according to the invention.

Figure 6B:
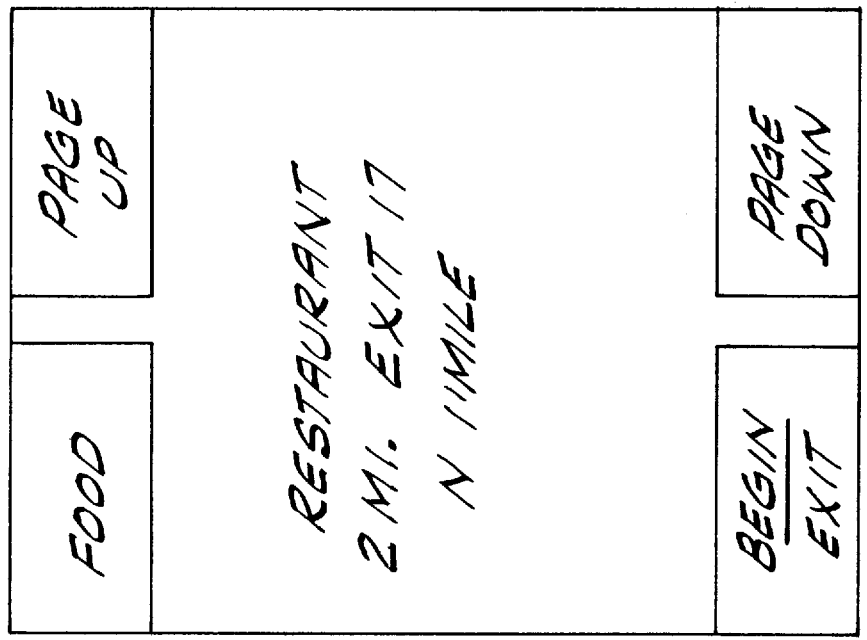
FIG. 6A–D are illustrations of displays on the PDA of FIG. 2 according to preferred embodiments of the present invention.
Figure 6A:
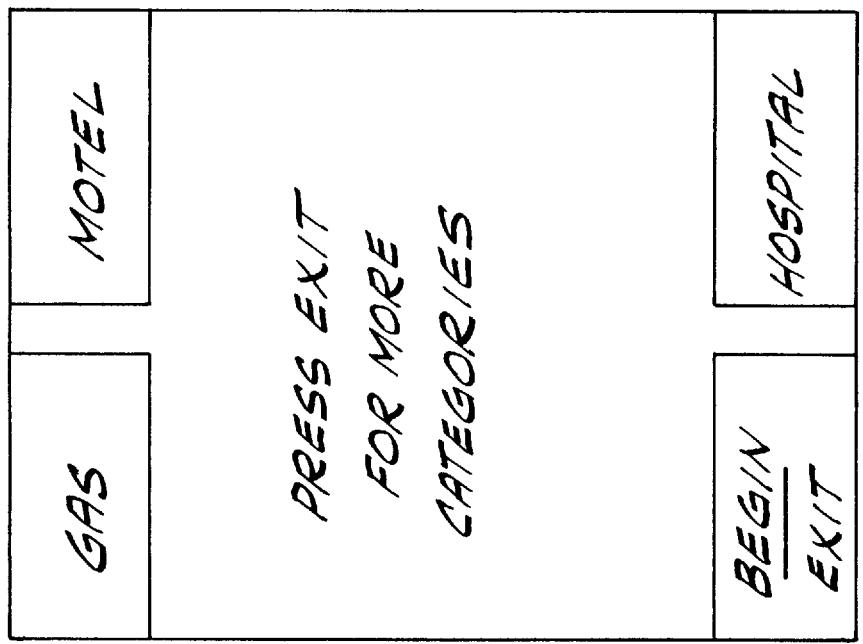

Further to the example, pressing an "Exit" key once from the display of FIG. 6A causes a "Food" key to be shown in the top left corner of the display (see FIG. 6B). Pressing "Food" may provide other categories of available options. Pressing "Exit" again provides additional options if those displayed are not desired. On the other hand, if a particular category is desired, the user presses the corresponding key. If at any time the user desires to end the program, he or she quickly presses "Exit" twice. A display, such as the one shown in FIG. 6C, verifies that the user wishes to exit the program.

Figure 6D:
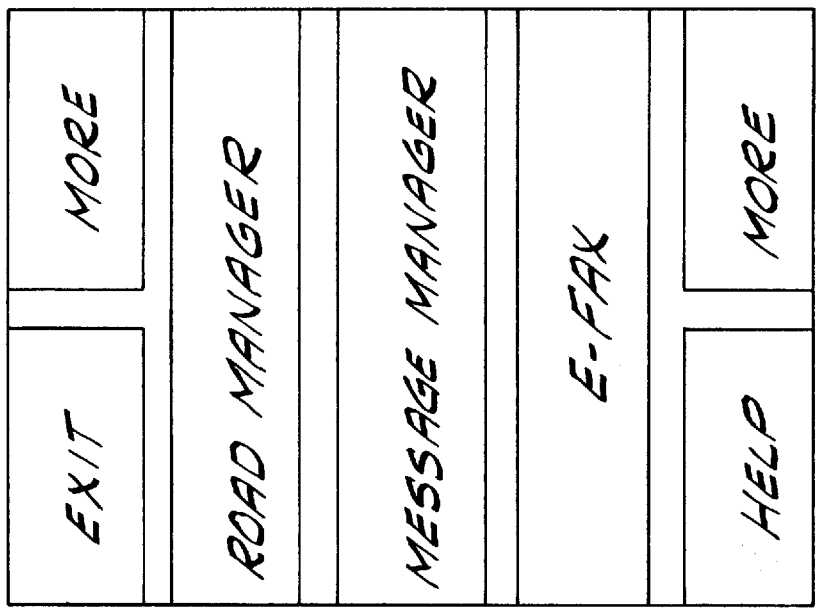
Figure 6C:
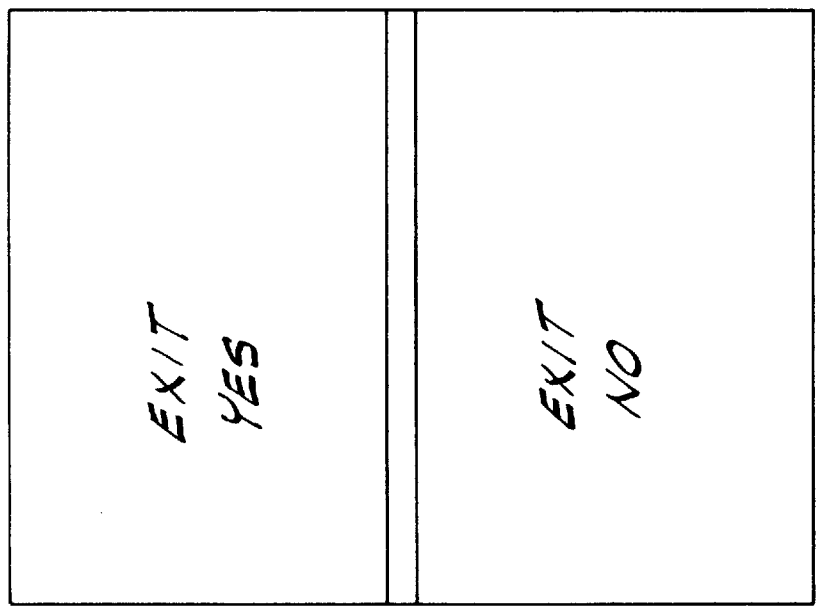

Each software program available with system 400 has its own set of keys and displays but runs under the general shell of the interface software. Thus, large keys and displays are provided so that the particular software would not need to be rewritten for each program. FIG. 6D illustrates a sample display for accessing several different programs on PDA 102 for use in the vehicle.

In alternative embodiments, a cradle according to the invention again includes a microprocessor for controlling operation of an IR data link and interface software. An upper portion of the cradle detachably receives a PDA and a lower portion of the cradle contains a microprocessor, a power supply, a PCMCIA interface and cage, and an infrared I/O link. The power supply (with 12 volt DC switched and unswitched inputs) provides power output to either power or recharge the PDA. The power supply also supplies power for illumination and for operating the onboard computer components, namely the microprocessor, the card interface and cage, the infrared communications link and an optional high speed IR communications interface for software and data communication. Additionally, the cradle provides access so the user can remove and insert PCMCIA cards in the PDA or, alternatively, the cradle provides through-ports for such connections as a Global Positioning System (GPS) antenna lead or a cellular-modem cable.

In these alternative embodiments, the cradle is essentially a complete microprocessor-based computer system capable of managing PCMCIA "card services" and operating a high-speed infrared I/O. In other words, the cradle is "intelligent". The cradle electronics are functionally equivalent to a personal computer, based on such processors as Intel 286®, Intel 386®, Intel 486®, the Pentium®, the Motorola® 68000 family, or other high performance processors. In addition to supporting at least two Type II PCMCIA cards, the card cage supports a Type III card for the added capacity needed for GPS navigation or other functions requiring high-capacity memory storage.

A system according to the invention optionally provides automatic dialing when a cellular telephone is in conjunction with the PDA via the cradle. The PDA and cradle system stores numerous phone numbers and provides the information to the telephone by placing the telephone over the cradle and generating the proper tones. In order to have cellular telephones respond to the tones from the PDA, a tone-to-digital store connector is used.

In such a system, the PDA screen displays names, addresses and phone numbers as large characters. Selection is made when the desired name and number appear on the screen by pressing a large key for calling. For automatic dialing, either the phone with appropriate acoustic or IR detection is held over PDA cradle for an instant to allow the numbers to be stored in the phone prior to transmission. Alternatively, the cradle may include a serial port to a cellular telephone installed in the vehicle.

Alternatively, the cradle includes a well for a cellular telephone to be detachably received in addition to the PDA. If such a dual cradle unit is installed in the vehicle, then electrical connection is also made between the cradle and the portable cellular telephone. The cradle additionally contains appropriate filtering and conversion electronics to apply charging power to the telephone. An indicator lamp optionally shows the state of the telephone's rechargeable battery.

In addition to cellular telephone applications, a GPS receiver card in the cradle enables position information to be communicated to the PDA which has highway service information stored in its memory. For example, the system provides the user with information of the nearest rest area in response to the vehicle's position and direction. A modem card may also be used to enable facsimiles to be sent or received. Such a card could be in the PDA itself or in a PCMIA slot in the cradle, thus increasing capability and avoiding the unnecessary insertion and removal of cards. Also, the user can be notified that a facsimile has been sent (or attempted to be sent depending on the capability of the cradle and PCMIA cards) even when the user is not near the PDA.

Additional features of alternative embodiments of the invention are directed to large solid state memories, parallel and serial communication channels and bi-directional infrared communication electronics. Interface circuits connect the computer processor to multiple PCMCIA card slots and each slot accepts Type I, Type II or Type III PCMCIA cards. The function of these cards ranges from simple memory to very sophisticated communications functions. For example, the PCMCIA cards may be used to provide the PDA with: 1) a solid state memory, such as SRAM, EEPROM, ROM, FLASH, FRAM, EPROM or DRAM; 2) a rotating memory, such as magnetic, magneto-optic or CD-ROM; 3) a cellular modem for data, electronic mail, facsimiles or BBS services; 4) a GPS receiver for vehicle location and route planning; and 5) a satellite communications transceiver with a built-in or vehicle-mounted antenna.

Function specific electronics may also be incorporated into the cradle to provide special requirements such as: 1) audio input and for voice commands (speaker independent speech recognition); 2) audio output electronics for high quality voice annunciation; and 3) printer interface for a small, lightweight thermal, laser or dot-matrix printer. Tasks that could be performed by software running on the electronics would vary depending upon the function of the PCMCIA card(s) installed in the cradle PCMCIA slot(s) and by special function electronics installed in the cradle. Examples of software-based cradle functions include maximizing infrared communications between the PDA and the cradle by selecting the highest speed available for the installed PDA and performing complex message handling services. Incoming electronic mail, facsimile, voice or data messages from a satellite or cellular transmission could be stored, printed, forwarded to a different location, or read to the user via audio voice circuitry. All retransmissions could be stored and sent when cellular or satellite rates were less expensive. In essence, this capability provides the user with a mobile office.

In addition, other software applications may include a touch-screen, behind-the-wheel expense entry program, allowing traveling persons to document expenditures and later link them to more extensive finance packages. Likewise, other programs would enable the user to log automobile use and accumulate automobile expenses, record cellular phone callback numbers and add simple notes, and perform calculator functions including calculations of fuel economy, time to distance, etc. Additionally, entertainment software may be included.

Systems according to the invention also provide interaction between the PDA and existing automobile systems through the cradle. For example, a conventional CD changer located in the vehicle can be interconnected to the PDA through the cradle to provide moving map displays on the PDA's screen. The map displays can be used in conjunction with the GPS described above to enable a powerful mobile information system without the need for an independent navigation-moving map system including a monitor. Other functions of the vehicle such as diagnostic information can likewise be accessed with appropriate software.

In yet another embodiment of the invention, the cradle contains an interface to the vehicle's intelligent controller. The vehicle-specific connection taps into the vehicle's main data bus or has a separate connection directly to the main controlling onboard computer. Thus, the cradle could have the capability of receiving information from and sending information to the vehicle's intelligence. Additional electronic circuits could be incorporated into the cradle to allow for high speed communications between the cradle and the vehicle's main controller. Since different models of vehicles have different on-board controllers and interfaces, high bandwidth software drivers act as the 'translator' that converts standard messages from the cradle software into vehicle-specific commands. Likewise, information from the vehicle is translated into standard cradle software messages. Further, access is provided to such vehicle subsystems as: 1) the trip computer, odometer, speedometer and/or fuel gauge; 2) vehicle system diagnostics; 3) the security system; 4) environmental control systems; and 5) the audio system.

An example of a software-based function for the cradle includes supplementing the on-board security system by monitoring the doors, engine, trunk, interior noise and vehicular movement. If a security breach occurs, the authorities could be notified via a cellular or satellite transmission. Vehicle location is given to the authorities via the cradle's GPS receiver PCMCIA card. Another example is providing the PDA with vehicle status information such as current location, available fuel and average speed. The interface on the PDA uses a Road Manager Database to determine the optimum location for refueling, based on time of day, brand loyalty, and number of gas stations at the candidate exit. In addition, should vehicle maintenance be required, the location and distance to the nearest repair facility is determined. This combination of PDA and cradle software essentially provides the user with an automatic trip itinerary. The cradle also provides access to the vehicle's audio CD-ROM changer. A multi-disk changer can be arranged so that one or two of the disks hold Road Manager data and digitized maps. This capability allows the PDA to request detailed or expanded information on the U.S. highway system. Thus, detailed moving map displays on the PDA are possible. Further, direct, automatic connection to local authorities can improve emergency situations. As an example, if the user presses a medical emergency panic button on the PDA's display, the cradle provides the Road Manager software with the current GPS receiver location. The Road Manager then requests access to the vehicle's CD-ROM database, via the cradle electronics, and receives the phone number of the nearest medical facility and a map of the shortest route between that facility and the vehicle's location. Road Manager then sends this map as well as vehicle and occupant information (such as medical ailments, current medication, age, sex and even perhaps the complete medical history of the occupants) via a cellular modem provided by the cradle electronics, to the medical facility.

For simplicity, the circuitry has been shown in block diagram form. It will be apparent to those skilled in the art that various other arrangements and circuits may be employed to achieve the purpose and function of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A personal onboard information system for use in a vehicle passenger compartment by a user in the compartment comprising:

a portable, personal computer, said computer being relatively small so as to be capable of being hand-held;

a touch-responsive screen having a display, said display being an on-screen menu of options available to the user of the computer, said on-screen menu being responsive to the user touching the screen for selecting from the available options, said computer being programmed to generate characters on the display;

a cradle mounted in the vehicle passenger compartment for detachably receiving the computer, said cradle adapted to support the computer such that the display can be viewed by the user in the passenger compartment when the computer is in the cradle; and an interface resident in the computer or in the cradle for formatting the display for use of the computer by the user in the vehicle passenger compartment when the computer is in the cradle, said interface including means for causing the display to display characters when the computer is in the cradle that are relatively larger than the characters displayed when the computer is not in the cradle so that the characters can be easily viewed by the user of the computer and so that the on-screen menu is responsive to the user touching the screen with a finger for selecting from the available options;

a memory for storing a plurality of prior selections by the user of the available on-screen menu options; and means for causing the screen to generate a preferred formatted display when the computer is in the cradle in response to the stored plurality of prior selections, said means for causing the screen to generate the preferred formatted display being part of the interface, said preferred formatted display including a dedicated portion and a variable portion wherein a preferred one of the available on-screen menu options is displayed at the dedicated portion and other available on-screen menu options are displayed at the variable portion, said preferred one of the available options being the most frequently selected option based on the plurality of prior selections stored in the memory, whereby the interface facilitates use of the computer in the vehicle passenger compartment when the computer is in the cradle.

2. The system of claim 1 further comprising a lamp on the cradle for illuminating the computer screen when the computer is in the cradle.

3. The system of claim 2 wherein the cradle includes a shroud for the lamp.

4. The system of claim 2 wherein the lamp is adjustable for varying the intensity of illumination.

5. The system of claim 1 further comprising a power supply on the cradle for supplying the computer with power when the computer is in the cradle.

6. The system of claim 5 wherein the computer includes a power input port and wherein the cradle includes a spring-loaded DC contact for connecting the power input port of the computer to the power supply.

7. The system of claim 6 wherein the power input port includes a flexible contact strip with a conductive pad whereby the DC contact is biased against the conductive pad of the flexible contact strip for electrically connecting the power supply to the power input port of the computer.

8. The system of claim 5 further comprising means for connecting the power supply to a battery of the vehicle.

9. The system of claim 1 further comprising a flexible mount for supporting the cradle in the vehicle passenger compartment whereby the cradle is mounted in the vehicle passenger compartment.

10. The system of claim 1 wherein the cradle includes a spring-loaded latch for detachably receiving the computer.

11. The system of claim 1 wherein the computer has a slot for receiving a card and the cradle includes a card access slot for permitting a card to be inserted in the card receiving slot of the computer when the computer is in the cradle.

12. The system of claim 1 wherein the interface is resident in the cradle and further comprising a data link interconnecting the interface and the computer when the computer is in the cradle.

13. The system of claim 12 wherein the computer includes at least one I/O port and wherein data link interconnects the interface and the I/O port when the computer is in the cradle.

14. The system of claim 13 wherein the data link comprises an infrared circuit providing optical communication between the interface and the I/O port of the computer.

15. The system of claim 12 wherein the cradle includes a microprocessor for controlling operation of the data link and the interface.

16. The system of claim 1 wherein the dedicated portion of the screen is at a corner of the screen.

17. The system of claim 1 wherein the dedicated portion of the screen is at an edge of the screen.

18. The system of claim 1 wherein the interface includes means for displaying on the on-screen menu relatively large icons representative of the available options whereby a passenger is able to recognize the icons while in the vehicle passenger compartment.

19. The system of claim 1 wherein the memory stores data relating to services available at locations along a highway and wherein the interface includes means for retrieving the stored data from the memory in response to input from the user identifying a desired service and an origin position.

20. A method for configuring a portable, personal computer for use in a vehicle passenger compartment, said computer being relatively small so as to be capable of being hand-held and including a touch-responsive screen having a display, said computer being programmed to generate characters on the display, said display being an on-screen menu of options available to the user of the computer, said on-screen menu being responsive to the user touching the screen for selecting from the available options, said method comprising the steps of:

detachably receiving the computer in a cradle mounted in the vehicle passenger compartment, said cradle adapted to support the computer such that the display can be viewed by the user in the passenger compartment when the computer is in the cradle;

formatting the display for use of the computer by the user in the vehicle passenger compartment when the computer is in the cradle by causing the display to display characters when the computer is in the cradle that are relatively larger than the characters displayed when the computer is not in the cradle so that the characters can be easily viewed by the user when the computer is in the cradle and so that the on-screen menu is responsive to the user touching the screen with a finger for selecting from the available options;

generating an on-screen menu on the display to display options available to the user, said on-screen menu being responsive to the user touching the screen for selecting from the available options;

storing in a memory a plurality of prior selections by the user of the available on-screen menu options; and displaying a preferred one of the available options at a dedicated portion of the display and other available on-screen menu options at a variable portion of the display when the computer is in the cradle, said preferred one of the available options being the most frequently selected option based on the plurality of prior selections stored in the memory whereby use of the computer in the vehicle passenger compartment is facilitated when the computer is in the cradle.

21. The method of claim 20 wherein the computer has at least one I/O port and wherein the step of formatting the display includes interconnecting an interface and the I/O port by a data link when the computer is in the cradle.

22. The method of claim 20 further comprising the step of illuminating the computer screen when the computer is in the cradle.

23. The method of claim 20 wherein the memory stores data relating to services available at location along a highway and further comprising the step of retrieving the stored data from the memory in response to input from the user identifying a desired service and an origin position.

24. The method of claim 20 further comprising the step of supplying the computer with power via the cradle from an external power source.

25. The method of claim 20 wherein the step of generating the on-screen menu includes displaying relatively large icons on the on-screen menu representative of the available options whereby the user is able to recognize the icons while in the vehicle passenger compartment.

* * * * *